United States Patent [19]

Harada et al.

[11] Patent Number: 4,845,654

[45] Date of Patent: Jul. 4, 1989

[54] PSEUDO RANDOM NOISE CODE GENERATOR

[75] Inventors: Masaaki Harada; Masahiro Hamatsu, both of Tokyo, Japan

[73] Assignee: Clarion Co., Ltd., Tokyo, Japan

[21] Appl. No.: 222,188

[22] Filed: Jul. 21, 1988

[30] Foreign Application Priority Data

Jul. 31, 1987 [JP]  Japan ................................ 62-192220

[51] Int. Cl.⁴ ............................................. G06F 1/02
[52] U.S. Cl. ................................................ 364/717
[58] Field of Search ......................... 364/717; 331/78; 375/115; 380/46, 50

[56] References Cited

U.S. PATENT DOCUMENTS

| 4,611,183 | 9/1986 | Piosenka et al. | 364/717 X |
| 4,748,576 | 5/1988 | Beker et al. | 364/717 |
| 4,785,410 | 11/1988 | Hamatsu et al. | 364/717 |

Primary Examiner—Gary V. Harkcom
Assistant Examiner—Tan V. Mai
Attorney, Agent, or Firm—Flynn, Thiel, Boutell & Tanis

[57] ABSTRACT

A pseudo random noise code generator in which a modular type shift register includes a multiplexer selecting the input for every stage thereof and a flipflop, whose input is the output of the multiplexer, the flipflop serving as the highest stage of the modular type shift register and feeding back the output thereof to each of the stages, and it is possible to control the number of stages of said shift register in operation by address-controlling the modular type shift register.

1 Claim, 6 Drawing Sheets

PSEUDO RANDOM NOISE CODE GENERATOR

FIELD OF THE INVENTION

This invention relates to a pseudo random noise code generator for digital data.

As a pseudo random noise code generator capable of generating arbitrary maximum length linearly occurring code sequences (hereinbelow abbreviated to M codes) by controlling externally the code period, the code pattern and the code phase, heretofore e.g. a circuit construction, as indicated in FIG. 6, has been adopted. In FIG. 6, $SR_1 \sim SR_n$ are flipflops and $E_1 \sim E_n$ are exclusive OR gates, which constitute a so-called modular type shift register, a flipflop and an exclusive OR gate forming a circuit constructing unit per stage of said shift register. MUX1 is a multiplexer, for controlling the number of stages of the modular type shift register by selecting the highest stage thereof in operation, $AND_2 \sim AND_n$ are AND gates specifying the presence or absence of feedback of signals from the output of the highest stage of the modular type shift register to each of the stages; and $G_1 \sim G_n$ are steering gates setting the initial value of the modular type shift register. That is, the address of the multiplexer MUX1 is specified by giving the multiplexer MUX1 data $C_1 \sim C_i$. Then the number of stages of said shift register is determined by selecting the highest stage thereof in operation, using the output of the specified address from the multiplexer MUX1, so that the period of the M codes is determined. Further the state of feedback of signals from the output of the highest stage of the modular type shift register to each of the stages is selected by giving the AND gates $AND_2 \sim AND_n$ data $a_2 \sim a_n$ to determine pattern of the M codes. Furthermore, the initial value of the modular type shift register is determined by giving the steering gate $G_1 \sim G_n$ data $b_1 \sim b_n$. In this way, it is possible to control independently the phase of the M codes respectively and thus an arbitrary M codes can be obtained.

However, in the device indicated in FIG. 6, since the highest stage of the modular type shift register is selected by the multiplexer so that the period of the M codes is determined, the position of the highest stage of the shift register depends on selection by the multiplexer and therefore a flipflop corresponding to the highest stage is not fixed. Consequently, it is not possible to obtain the output of the highest stage of the modular type shift register directly from the highest stage of the flipflops, but said output must be taken out necessariy through the multiplexer. For this reason, the prior art device had a disadvantage that the propagation delay time of said output of the highest stage in said register until an M code can be obtained increases, corresponding to the time, during which the signal passes through the multiplexer.

OBJECT OF THE INVENTION

The object of this invention is to provide a pseudo random noise code generator, in which the period of codes can be controlled by selecting the number of stages in a modular type shift register, and wherein the position of the highest stage of the modular type shift register is fixed so that it is possible to receive signals from other external or internal circuit blocks and to transmit them thereto so as to reduce the propagation delay time of the signals.

SUMMARY OF THE INVENTION

In order to achieve the above object, a pseudo random noise code generator according to this invention is characterized in that a modular type shift register constructed by connecting a plurality of circuit constructing units in cascade, each unit consisting of an exclusive OR gate, a first flipflop holding temporarily operation results of the exclusive OR gate, an AND gate, whose output is connected with an input of the exclusive OR gate and controls operations and a steering gate setting the initial state of the first flipflop, comprises further a multiplexer selecting one of the inputs of the flipflops in the circuit constructing units of the modular type shift register and a second flipflop holding temporarily the output of the multiplexer.

Contrarily to the prior art wherein the output of each of the stages of the modular type shift register was selected by the multiplexer, according to this invention, the input of each of the stages of the modular type shift register is selected by the multiplexer. Consequently, the output of the multiplexer is the input signal to the highest stage of the modular type shift register and by disposing newly a flipflop $SR_f$ in the stage succeeding the multiplexer, $SR_f$ is always fixed at the highest stage of the modular type shift register, in whatever way the number of stages of the modular type shift register is controlled.

DETAILED DESCRIPTION

Figure 1:
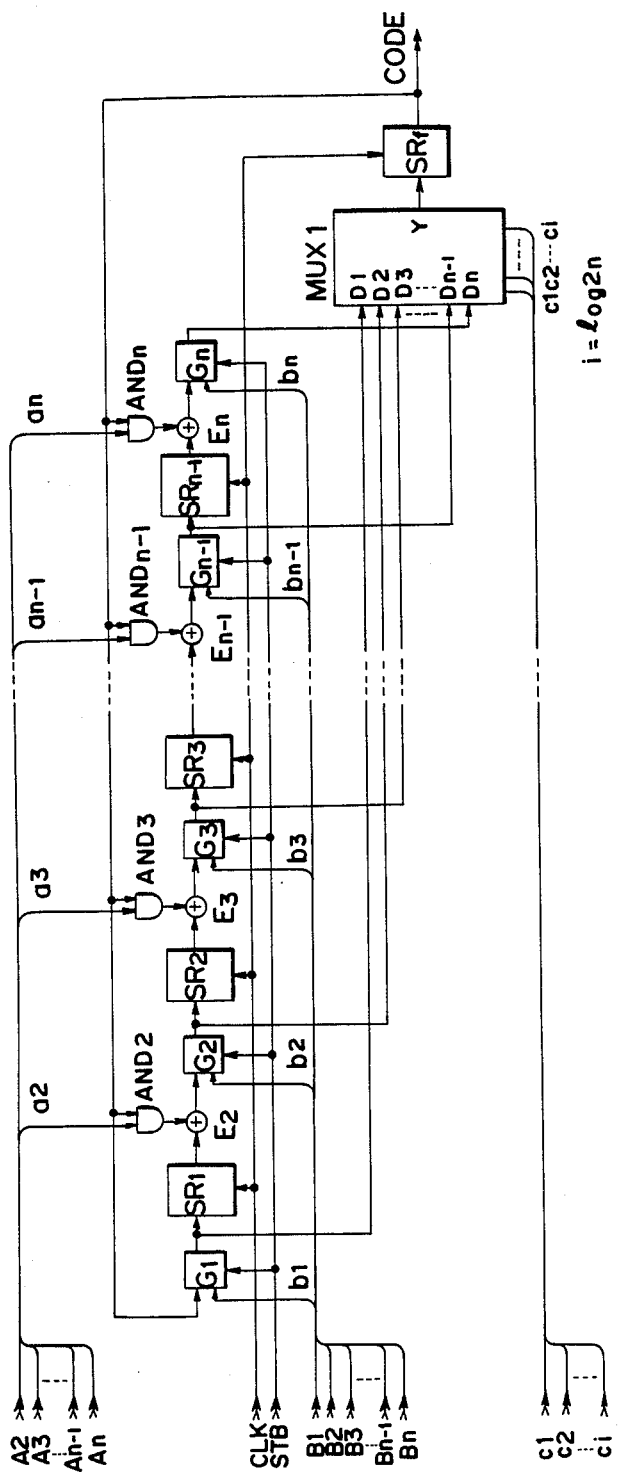
FIG. 1 is a block diagram illustrating the basic construction of the principal part of a pseudo random noise code generator according to this invention.

FIG. 1 is a block diagram illustrating the basic construction of the principal part of a pseudo random noise code generator according to this invention. In the figure, the blocks designated by the same reference numbers as those in FIG. 6 have the same function as that in FIG. 6. The device indicated in FIG. 1 differs from that indicated in FIG. 6 in that the inputs $D_1 \sim D_n$ to the multiplexer MUX1 are changed from the output of each of the flipflops $SR_1 \sim SR_n$ to the input thereof and that there is no flipflop $SR_n$ and a new flipflop $SR_f$ is disposed in the stage succeeding the multiplexer MUX1. By the arrangement according to this invention described above, the output of the highest stage of the modular type shift register can be taken out to the exterior without passing through the multiplexer and it is possible to reduce the propagation delay time correspondingly.

Figure 2:
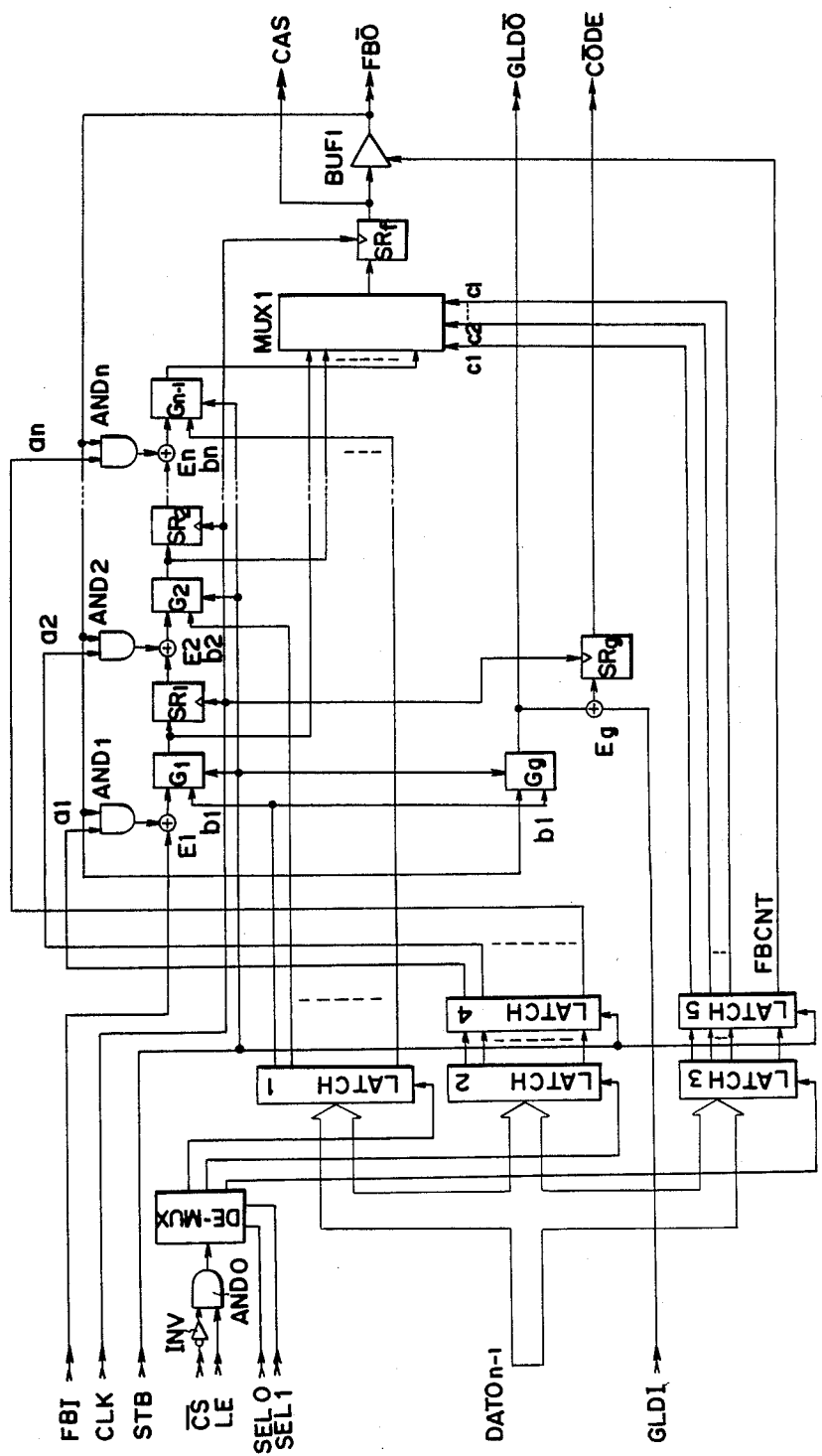
FIG. 2 is a block diagram illustrating an embodiment of the pseudo random noise code generator according to this invention.
Figure 4:
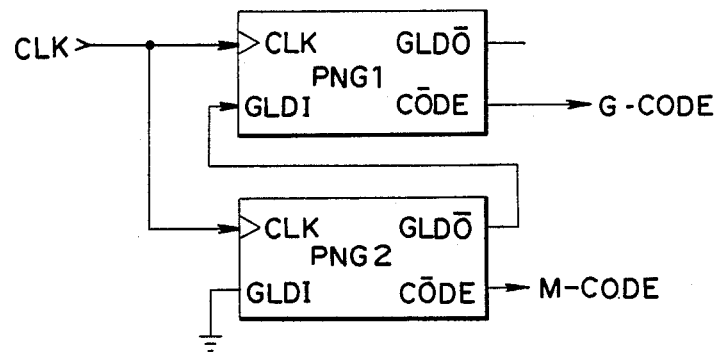
FIG. 4 is a block diagram illustrating the construction of GOLD code generating device.

FIG. 2 illustrates an embodiment of the pseudo random noise code generator according to this invention, in which it is taken into account that the generator is formed by using ICs. In the device indicated in FIG. 2, in order to reduce the number of data lines, LATCH1-~LATCH3 are disposed; the address of each of the LATCHes is controlled by an inverter INV and a demultiplexer DE-MUX; and code period data ($c_1 \sim c_i$), code pattern data ($a_1 \sim a_n$) and code phase data ($b_1 \sim b_n$) are inputted to each of the LATCHes by time sharing and held therein. In order that the M code is not changed over during the setting of code data, the latch for the code pattern data and that for the code period data have double structures consisting of LATCH2 and LATCH4, and LATCH 3 and LATCH5, respectively, and LATCHes 4 and 5 serves to change a M code by using an STB signal as a trigger, in cooperation with the steering gates $G_1 \sim G_n$ setting the code phase data. Further, for the device indicated in FIG. 2, in order that it is made possible to generate a long period M code by connecting a plurality of these devices in cascade, an AND gate $AND_1$ and an exclusive OR gate $E_1$ are disposed in the first stage of the modular type shift register and a three-state buffer BUF1 is added to the stage thereof. In addition, the device indicated in FIG. 2 includes another exclusive OR gate $E_g$ and another flipflop $SR_g$ so that GOLD codes (G-CODE) and M codes (M-CODE) can be obtained easily by connecting two of these devices PNG1 and PNG2, as indicated in FIG. 4.

In FIG. 2, CLK represents a clock signal input terminal; STB a strobe signal input terminal; CS a chip select signal input terminal; LE a latch enable signal input terminal; $DAT_0 \sim DAT_{n-1}$ data input terminals; GLDI and GLDO connection terminals for generating GOLD codes; FBI, FBO and CAS cascade connection terminals; and CODE M-CODE output terminal.

Figure 6:
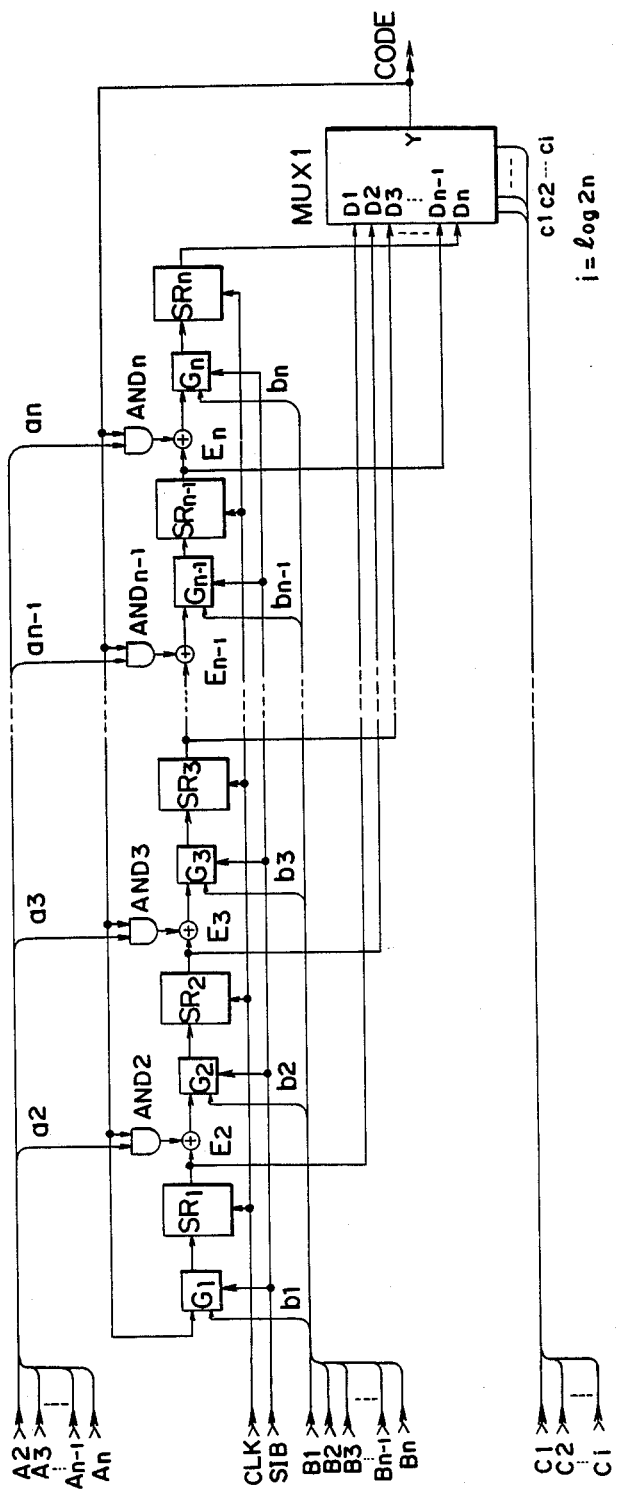
FIG. 6 is a block diagram illustrating the basic construction of the principal part of a prior art pseudo random noise code generator.
Figure 7:
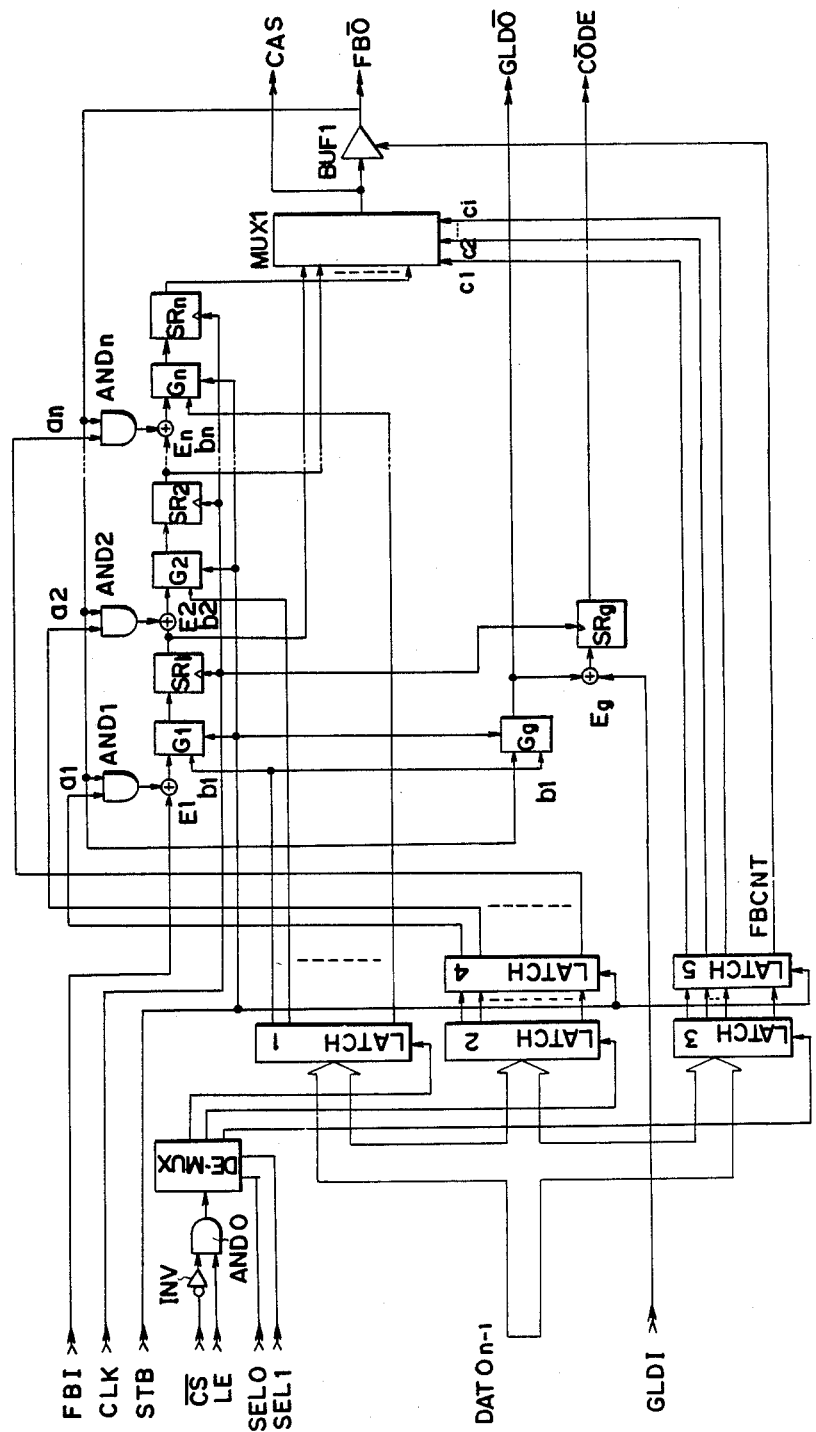
FIG. 7 is a block diagram illustrating an example of the prior art pseudo random noise code generator.

FIG. 7 shows a prior art pseudo random noise code generator, which has the same structure as that indicated in FIG. 2, except that the basic portion is constructed, as indicated in FIG. 6.

Figure 3A:
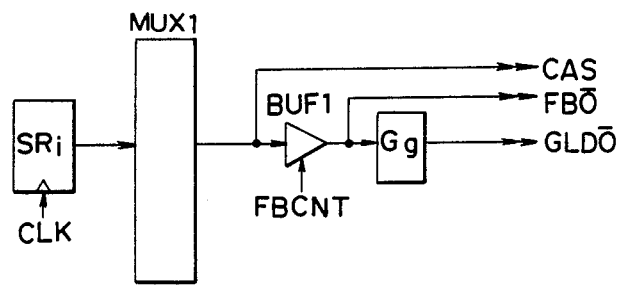
FIGS. 3(a) and 3(b) are schemes of signal propagation paths from the last stage of the modular type shift register to an external output.
Figure 3B:
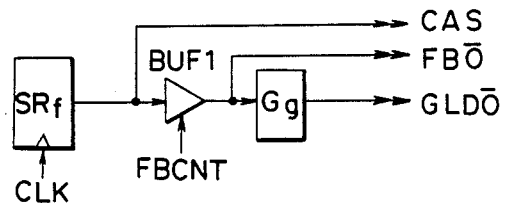

FIGS. 3(a) and 3(b) show signal propagation paths from the highest stage of the modular type shift register according to the prior art arrangement and to the arrangement of this invention, respectively, through the CAS terminal for cascade connection, the FBO terminal and the GLDO terminal for generating GOLD codes. In FIG. 3(a), $SR_i$ designates the flipflop selected by the multiplexer MUX1. The signal propagation path according to the arrangement of this invention is reduced than that required by the prior art arrangement wherein the signal passes through the multiplexer and therefore it is possible to reduce the propagation delay time.

Furthermore, it is possible to construct a GOLD code generating device, as indicated in FIG. 4, by using a pseudo random noise code generator of this invention, as indicated in FIG. 2. In FIG. 4, PNG1 and PNG2 represent pseudo random noise code generators having the same structure as indicated in FIG. 2.

Figure 5A:
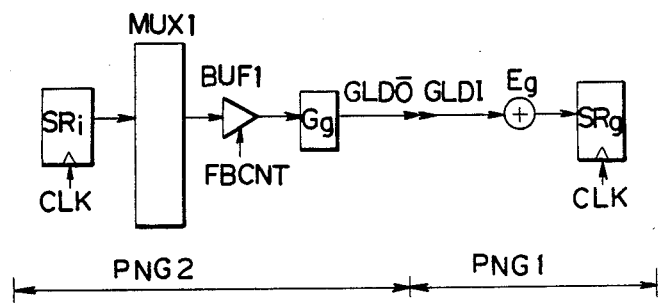
FIGS. 5(a) and 5(b) are schemes showing critical paths at the formation of the gold code generating device.
Figure 5B:
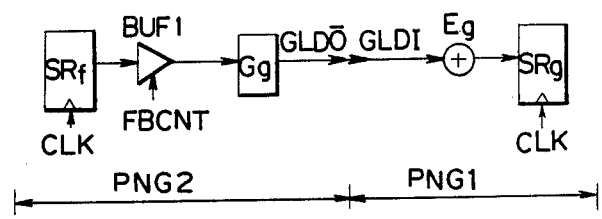

FIGS. 5(a) and 5(b) show the signal propagation paths (hereinbelow called a critical path), wherein the propagation delay time become maximum in a case that prior art pseudo random noise code generator and a pseudo random noise code generator of this invention are used in the GOLD code generating device indicated in FIG. 4. The signal propagation path in the device of this invention indicated in FIG. 5(b) is reduced in comparison with that required by the prior art indicated in FIG. 5(a) by the time, during which the signal passes through the multiplexer, and therefore it is possible to increase the highest clock frequency used therein.

Further, according to the arrangement of this invention, although a new flipflop $SR_f$ is necessary, since the flipflop $SR_n$ required by the prior art become unnecessary, the number of constituent elements remains unchanged.

As explained above, according to this invention, the following advantages are obtained.

(i) In a pseudo random noise code generator, in which the number of constituent stages of the modular type shift register can be controlled, it is possible to construct the highest stage of the modular type shift register always with a same flipflop.

(ii) Owing to the effect described in (i), it is possible to take out the output of the highest stage of the modular type shift register to the exterior without making it pass through any selection circuit such as a multiplexer, etc. and to reduce the propagation delay time.

(iii) Owing to the effect described in (ii), in a device, in which the output of the highest stage of the modular type shift register is taken out to the exterior and which is constructed by adding an external circuit thereto, it is possible to increase the highest clock frequency used therein.

What is claimed is:

1. A pseudo random noise code generator comprising:
   a modular type shift register constructed by connecting a plurality of circuit constructing units in cascade, each unit consisting of an exclusive OR gate, a first flipflop holding temporarily operation results of the exclusive OR gate, an AND gate whose output is connected with an input of the exclusive OR gate and controls operations and a steering gate setting the initial state of the first flipflop;
   a multiplexer selecting one of the inputs of said flipflops in said circuit constructing units of said modular type shift register;
   a second flipflop holding temporarily the output of said multiplexer; and
   means for taking out the output of said second flipflop and at the same time feeding back said output to the AND gate in each of said circuit constructing units of said modular type shift register

* * * * *